(12) United States Patent
Chow

(10) Patent No.: US 10,752,334 B2
(45) Date of Patent: Aug. 25, 2020

(54) COLLAPSIBLE AND RAPIDLY-DEPLOYABLE UNMANNED AERIAL VEHICLE

(71) Applicant: Edward Chow, Brea, CA (US)

(72) Inventor: Edward Chow, Brea, CA (US)

( * ) Notice: Subject to any disclaimer, the term of this patent is extended or adjusted under 35 U.S.C. 154(b) by 250 days.

(21) Appl. No.: 15/723,134

(22) Filed: Oct. 2, 2017

(65) Prior Publication Data

US 2018/0093753 A1    Apr. 5, 2018

Related U.S. Application Data

(60) Provisional application No. 62/402,885, filed on Sep. 30, 2016.

(51) Int. Cl.
*B64C 11/28* (2006.01)
*F41F 1/00* (2006.01)
(Continued)

(52) U.S. Cl.
CPC ............... *B64C 1/30* (2013.01); *B64C 11/28* (2013.01); *B64C 27/08* (2013.01); *B64C 39/024* (2013.01); *B64F 1/06* (2013.01); *B64C 2201/024* (2013.01); *B64C 2201/027* (2013.01); *B64C 2201/042* (2013.01); *B64C 2201/084* (2013.01); *B64C 2201/108* (2013.01); *B64C 2201/123* (2013.01); *B64C 2201/146* (2013.01);
(Continued)

(58) Field of Classification Search
CPC ... F42B 10/16; B64G 1/222; B64C 2201/024; B64C 2201/027; B64C 2201/042; B64C 2201/108; B64C 2201/201; B64C 1/30; E04H 12/185; E04H 12/187; E04C 3/005; E04B 1/343; E04B 1/34357; E04B 1/34384; E04B 1/348; E04B 2001/3276; E04B 2002/0202; E04B 2201/0153; A63H 33/00; A63H 33/003
See application file for complete search history.

(56) References Cited

U.S. PATENT DOCUMENTS 2,923,241 A * 2/1960 House ................. F42B 10/14
244/3.29
2,924,175 A * 2/1960 Jasse ................... F42B 10/16
244/3.29
(Continued)

*Primary Examiner* — Christopher P Ellis

(57) ABSTRACT

A collapsible unmanned aerial vehicle has: a cylindrical structural body; a plurality of deployable mechanisms laterally distributed about the cylindrical structural body; a control unit; a portable power source; each of the plurality of deployable mechanisms comprising a lift-generating device, a pliable pylon and an actuation mechanism, the cylindrical structural body being terminally mounted to the pliable pylon, the lift-generating device being terminally mounted to the pliable pylon, the actuation mechanism being operatively integrated along the pliable pylon, the pliable pylon being selectively configured to be radially straightened from the cylindrical structural body and to arcuately collapsed into the cylindrical structural body via the actuation mechanism, the control unit and the portable power source each being electrically connected to the actuation mechanism; the control unit and the portable power source being mounted within the cylindrical structural body; and the portable power source being electrically connected to the control unit.

8 Claims, 12 Drawing Sheets

(51) Int. Cl.
  B64C 1/30   (2006.01)
  B64C 39/02  (2006.01)
  B64C 27/08  (2006.01)
  B64F 1/06   (2006.01)
  *F42B 10/16*    (2006.01)
  *F42B 15/01*    (2006.01)
  *F41F 3/042*    (2006.01)

(52) U.S. Cl.
  CPC .......... *B64C 2201/201* (2013.01); *F41F 1/00* (2013.01); *F41F 3/042* (2013.01); *F42B 10/16* (2013.01); *F42B 15/01* (2013.01)

(56) References Cited

U.S. PATENT DOCUMENTS

| | | | | |
|---|---|---|---|---|
| 4,155,524 A * | 5/1979 | Marello | ................. | B64G 1/443 136/245 |
| 4,296,895 A * | 10/1981 | Pazmany | ................. | F42B 10/64 102/388 |
| 4,406,096 A * | 9/1983 | Matsutani | ............. | E04H 12/185 242/390.2 |
| 4,787,580 A * | 11/1988 | Ganssle | ................. | B64G 1/222 244/172.6 |
| 5,319,905 A * | 6/1994 | Szirtes | ................... | B64G 1/443 136/245 |
| 5,833,176 A * | 11/1998 | Rubin | .................... | B64G 1/222 244/172.7 |
| 6,031,178 A * | 2/2000 | Kester | .................... | B64G 1/222 136/245 |
| 6,431,019 B1 * | 8/2002 | Greene | ...................... | B25J 9/06 267/70 |
| 9,393,000 B2 * | 7/2016 | Donhowe | .............. | A61B 17/00 |
| 9,676,477 B1 * | 6/2017 | Kimchi | .................. | B64C 27/00 |
| 2002/0112417 A1 * | 8/2002 | Brown | ................... | B64G 1/222 52/108 |
| 2004/0058765 A1 * | 3/2004 | Kubein-Meesenburg | ................... | B25J 15/0009 474/206 |
| 2007/0261320 A1 * | 11/2007 | Lucas | ..................... | E04C 3/005 52/100 |
| 2008/0283670 A1 * | 11/2008 | Harvey | ................. | B64G 1/222 244/172.6 |
| 2009/0184207 A1 * | 7/2009 | Warren | ................... | B64G 1/222 244/172.6 |
| 2010/0116937 A1 * | 5/2010 | Sanderson | ............. | B64C 3/185 244/123.1 |
| 2012/0025009 A1 * | 2/2012 | Geswender | ............. | F42B 10/16 244/3.27 |
| 2014/0042275 A1 * | 2/2014 | Abrams | ................. | B64G 1/222 244/172.6 |
| 2015/0321755 A1 * | 11/2015 | Martin | .................... | B64C 27/50 244/17.23 |
| 2016/0024790 A1 * | 1/2016 | Baudasse | ................ | E04C 3/005 52/108 |
| 2016/0101856 A1 * | 4/2016 | Kohstall | .................. | G05D 1/101 244/17.13 |
| 2016/0137319 A1 * | 5/2016 | Steele | .................... | B64G 1/443 52/745.2 |
| 2016/0159471 A1 * | 6/2016 | Chan | ..................... | B64C 39/024 244/39 |
| 2016/0272317 A1 * | 9/2016 | Cho | ........................ | G08G 1/09 |
| 2017/0152035 A1 * | 6/2017 | Zhao | ..................... | B64C 39/024 |
| 2017/0197703 A1 * | 7/2017 | Wood | ..................... | B64C 27/08 |
| 2018/0148168 A1 * | 5/2018 | Newman | ................. | B64C 27/08 |
| 2018/0178896 A1 * | 6/2018 | Lee | ........................ | B64C 11/28 |
| 2018/0257774 A1 * | 9/2018 | Volpi | ....................... | B25J 11/00 |
| 2018/0327092 A1 * | 11/2018 | Deng | ..................... | B64C 25/52 |
| 2018/0354657 A1 * | 12/2018 | Kelleher | ................. | B64G 1/007 |
| 2019/0084673 A1 * | 3/2019 | Chen | ..................... | B64C 3/56 |
| 2019/0092496 A1 * | 3/2019 | Santos Soto | .......... | B64G 1/222 |

* cited by examiner

COLLAPSIBLE AND RAPIDLY-DEPLOYABLE UNMANNED AERIAL VEHICLE

The current application claims a priority to the U.S. Provisional Patent application Ser. No. 62/402,885 filed on Sep. 30, 2016.

FIELD OF THE INVENTION

The present invention generally relates to a collapsible unmanned aerial vehicle. More specifically, a cylindrical structural body having a plurality of deployable mechanisms, each selectively expanding or retracting a lift-generating device, enables a space-efficient and rapidly deployable unmanned aerial vehicle.

BACKGROUND OF THE INVENTION

The present invention is a rapidly-deployable unmanned aerial vehicle (RUAV) capable of collapsing into a space efficient shape. The collapsible nature of the RUAV enables multiple RUAVs to fit into a small space, such as inside a backpack. This also facilitates a lightweight construction so that a soldier can carry dozens of RUAVs in the same manner that he or she carries dozens of grenades. Due to the small size of the RUAV, a small container can carry dozens of RUAVs and launch them at the same time to increase the deployment speed and density. Once deployed, the RUAV can be remote controlled like a traditional unmanned aerial vehicle. The present invention is a small, smart, and easily deployable RUAV able to increase the surveillance coverage area, defend UAV attacks, defend attack from armored vehicles such as tanks and suicide attack vehicles, seek and destroy snipers, and of intelligent targeting to avoid collateral damage.

For example, in one particular application, the RUAV may be used to defend against a suicide bomber. In this case, the RUAV can be used to destroy the suicide bomber attack vehicle. A soldier can pop the RUAV open and direct the RUAV to the suicide bomber truck. The automated target recognition capability of the RUAV will be able to fly around the truck, seek the bottom of the truck, fly under the truck, and blow up the truck. The RUAV can also fly on top of the truck and ignite an electromagnetic pulse (EMP) attack weapon to disable the electronics to stop the truck.

In yet another application, the RUAV may be used to defend a truck or an army convoy. The RUAV can be used to destroy opposing vehicles such as a tank, by automatically recognizing the tank tracks. This will enable a foot soldier to destroy the tank tracks which renders military tank useless in the battlefield.

In yet another application, the RUAV can be used to defend a friendly UAV. The RUAV can be used to defend against attack on friendly UAVs. The high-speed nature of the RUAVs allows them to quickly survey the perimeter of a protected area. As such, the RUAVs will be able to intercept and destroy the attack UAVs using nets, jammer, explosive, or other methods.

In yet another application, the RUAV can be used to defend against a sniper. The built-in IR camera can be used to seek hidden heat sources and apply countermeasures.

In yet another application, the RUAV can be used to provide soldiers with intelligent targeting capabilities.

The lightweight and high-performance design of the present invention, allows the present invention to outperform most traditional UAVs in speed, maneuverability, and agility. Additionally, the present invention enables greater portability, versatility, and functionality through the mass deployment and artificial intelligence techniques.

DETAILED DESCRIPTION OF THE INVENTION

All illustrations of the drawings are for the purpose of describing selected versions of the present invention and are not intended to limit the scope of the present invention.

Figure 1:
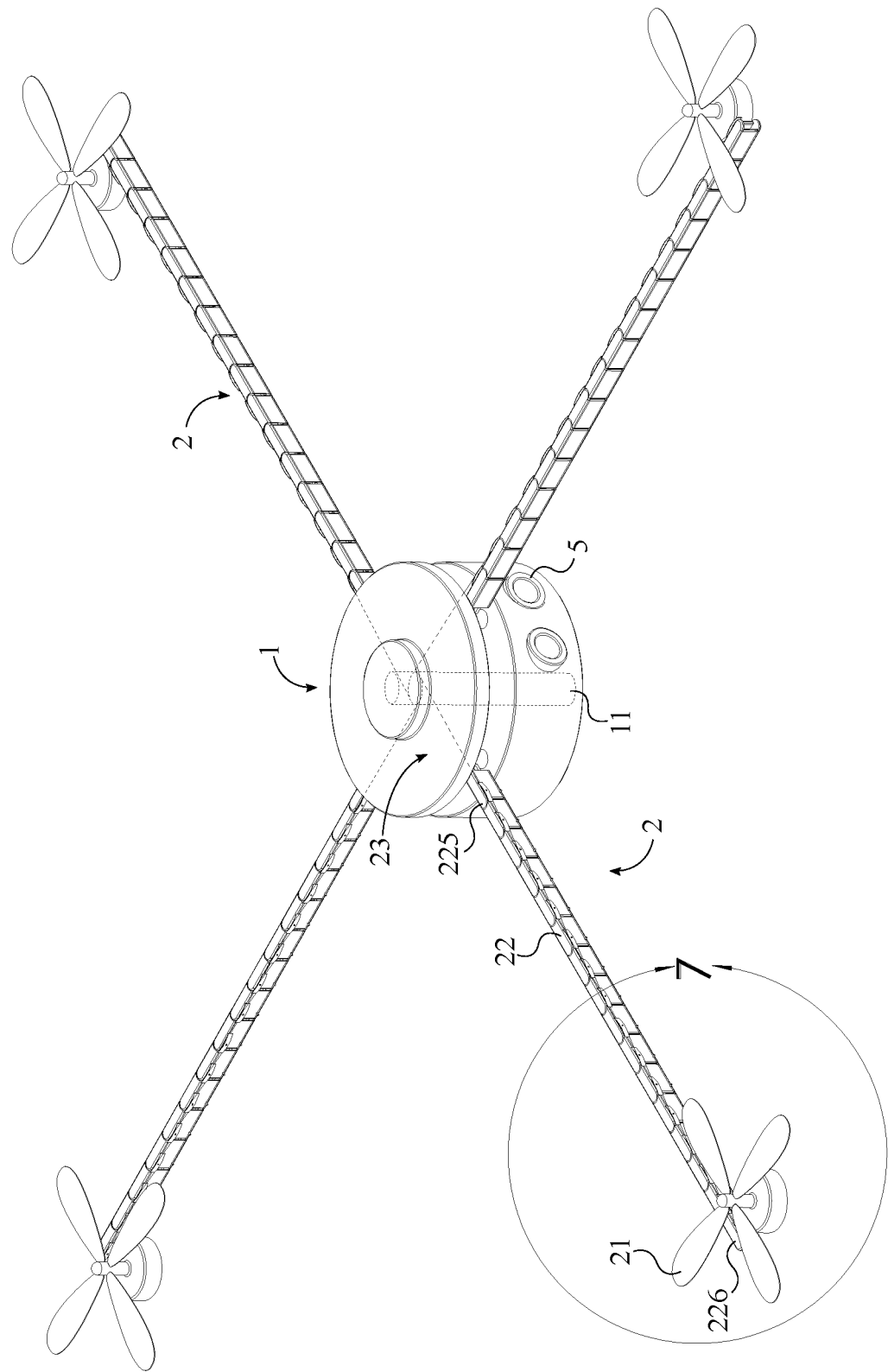
FIG. 1 is a top perspective view of the present invention in the operative configuration.

The present invention is a collapsible unmanned aerial vehicle capable of transforming into a compact shaft for ease of storage and transportation. The present invention is preferably contained in a receptacle, such as a canister or the like, for ease of transportation and rapid deployment. FIG. 1 shows the preferred embodiment of the present invention. As such, the present invention comprises a cylindrical structural body 1, a plurality of deployable mechanisms 2, a control unit 3, and a portable power source 4. The plurality of deployable mechanisms 2 collapse to create a cylindrical structural body 1 that can be store in confined spaced. The control unit 3 controls the position and secondary functionalities of the present invention, while the portable power source 4 supplies power to the electrically operated components. Thus, the control unit 3 is electronically connected to the actuation mechanism 23 of each of the plurality of deployable mechanisms 2. A cylindrical shape allows the cylindrical structural body 1 to be stored in confined spaces such as a pocket of a backpack. The plurality of deployable mechanisms 2 selectively deploy lift generation mechanisms, such as rotors and the like, when the present invention transforms into an operative mode. As such, each of the plurality of deployable mechanisms 2 comprises a lift-generating device 21, a pliable pylon 22, and an actuation mechanism 23. The preferred lift-generating device 21 may be a rotor or similar electric motorized power units.

Figure 2:
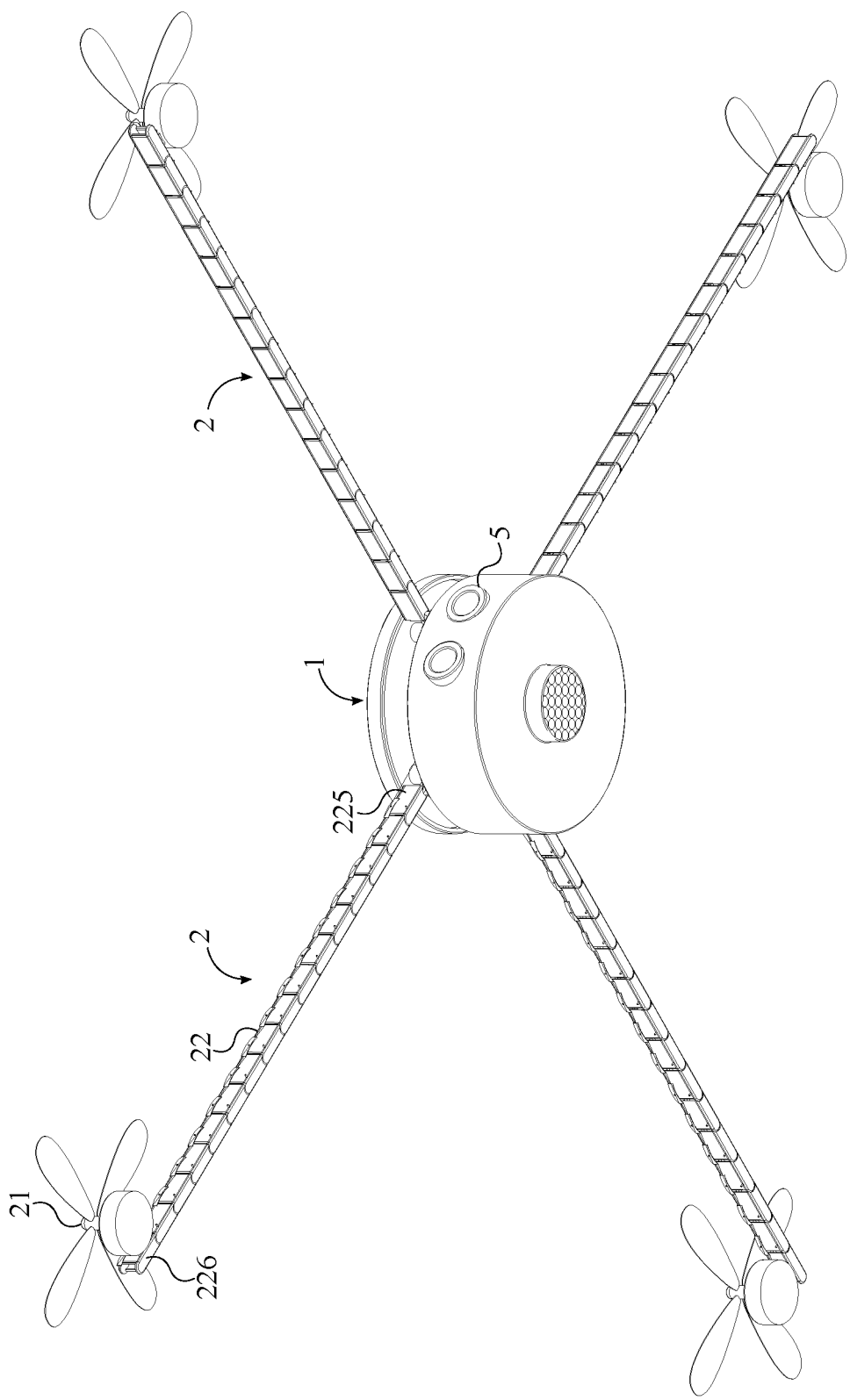
FIG. 2 is a bottom perspective view of the present invention in the operative configuration.

Referring to FIG. 1 and FIG. 2, the pliable pylon 22 can transform from an operative configuration into a collapsed configuration. In the operative configuration, the pliable pylon 22 takes a straight shape, whereas in a collapsed configuration the pliable pylon 22 takes an arcuate shape that conforms to the contours of the cylindrical structural body 1. As such, the plurality of deployable mechanisms 2 is laterally distributed about the cylindrical structural body 1. In particular, the cylindrical structural body 1 is terminally mounted to the pliable pylon 22, while the lift-generating device 21 is terminally mounted to the pliable pylon 22, opposite to the cylindrical structural body 1. In the preferred embodiment of the present invention, the cylindrical structural body 1 comprises a central pole and a plurality of peripheral poles. Each deployable mechanism terminally mounts a corresponding peripheral pole. In the collapsed position, the plurality of deployable mechanisms 2 is stacked upon each other. More specifically, an arbitrary pylon is positioned vertically offset from an adjacent pylon. This allows the plurality of deployable mechanisms 2 to completely encompass the cylindrical structural body 1. A payload bay integrated into the cylindrical structural body 1 may be loaded with payloads such as sensors, explosives, net catches, electromagnetic pulse (EMP) attach device, short range jammer, and etc.

The actuation mechanism 23 allows the pliable pylon 22 of each of the deployable mechanisms to transform into the operative configuration. More specifically, the actuation mechanism 23 is operatively integrated along the pliable pylon 22, wherein the actuation mechanism 23 is used to radially straighten the pliable pylon 22 from the cylindrical structural body 1 and is used to arcuately collapse the pliable pylon 22 into the cylindrical structural body 1. In the operative configuration, the pliable pylon 22 is in a radially straight position. This positions the lift-generating device 21 of the plurality of deployable mechanisms 2 away from the cylindrical structural body 1, able to harness air and generate lift. The pliable pylon 22 arcuately collapses into the cylindrical structural body 1 to transition into a collapsed configuration. In the collapsed position, the lift generating device is contained inside the cylindrical structural body 1. This also protects the lift-generating device 21 from environmental elements. The control unit 3 and the portable power source 4 is mounted within the cylindrical structural body 1, away from harmful environmental elements that can interfere with the electric components of the present invention.

Figure 3:
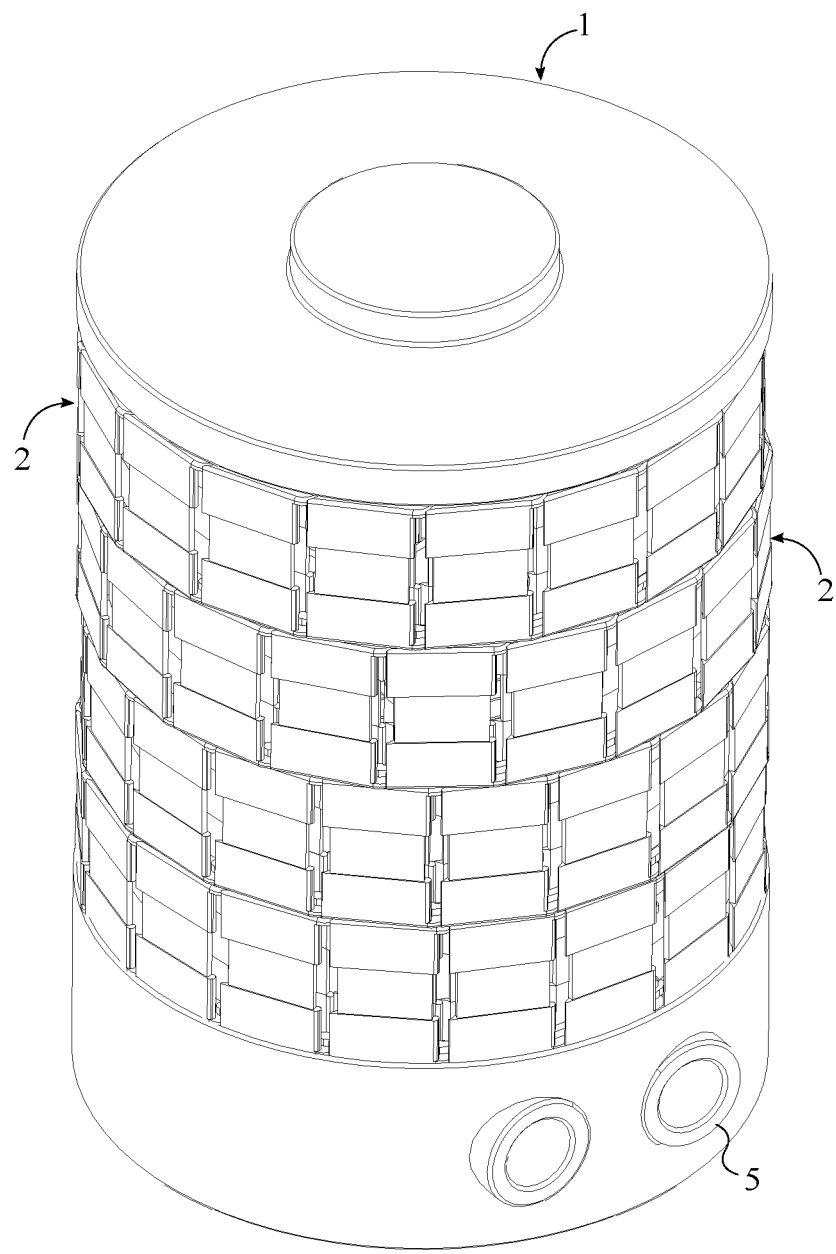
FIG. 3 is a top perspective view of the present invention in the collapsed configuration.

A sensing unit 5 helps the present invention navigate and orient itself. FIG. 3 shows the sensing unit 5 laterally mounted onto the cylindrical structural body 1. The preferred embodiment of the sensing unit 5 may comprise a camera. For example, the stereo vision camera may be positioned inside the main body. The lens or lenses of the camera may project out of the lateral surface of the main body, giving the camera a wide field-of-vision. The sensing unit 5 is positioned in between the plurality of deployable mechanisms 2 and a base portion of the cylindrical structural body 1. The base portion is positioned on the bottom surface of the main body. The main boy is a water-tight, air-tight structure that houses the control unit 3 and the portable power source 4. Further the base portion also protects electric components from environmental elements capable of interfering with the electric circuitry. The sensing unit 5 may also comprise a Global Positioning System (GPS), an altimeter, an accelerometer, a gyroscope, a magnetometer, and similar sensors.

Figure 11:
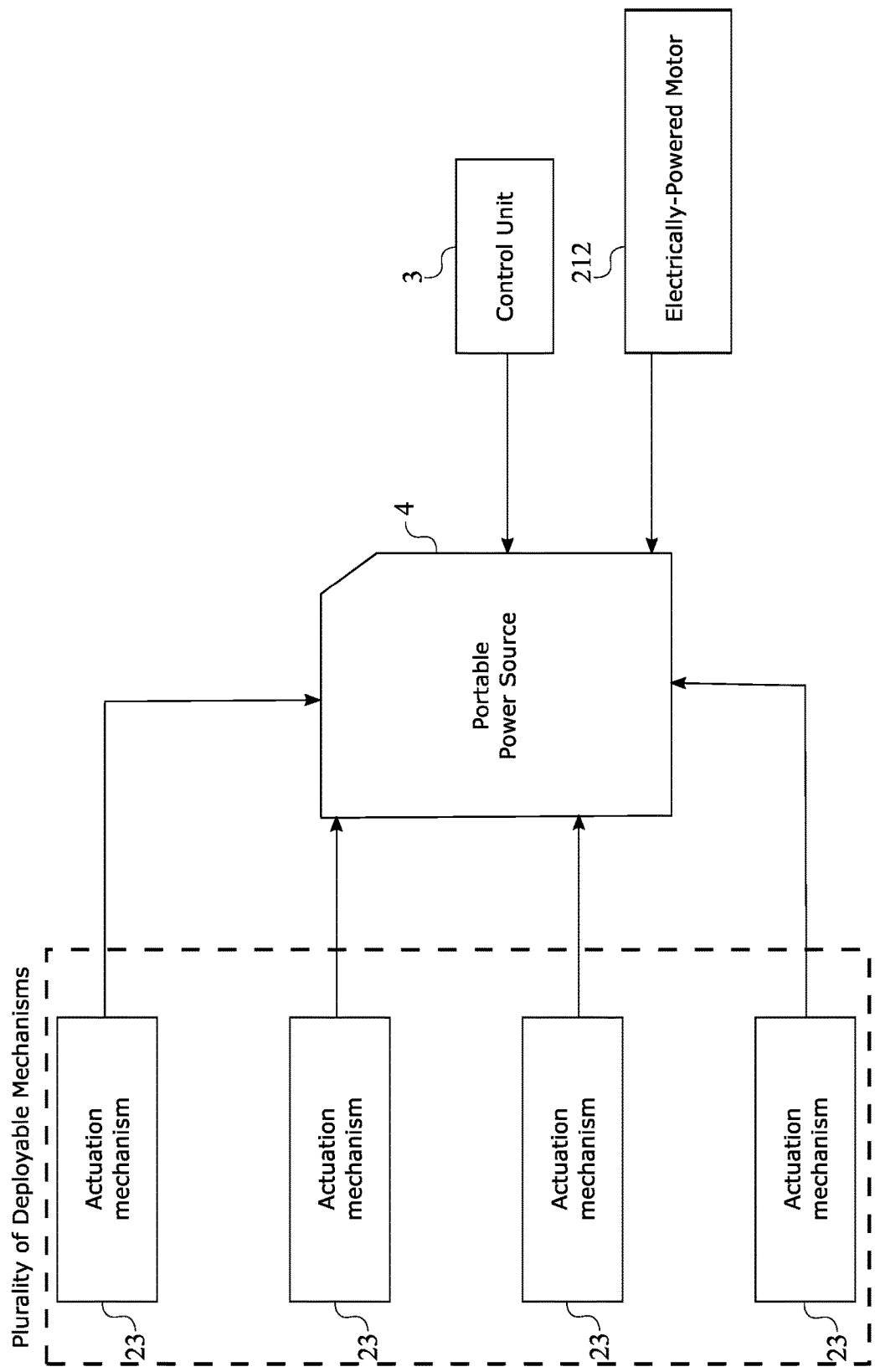
FIG. 11 is a schematic view of the electric connections of the present invention.

Referring to FIG. 11, preferably, a removable battery compartment may act as the power source. The removable battery compartment is physically removed for storage purposes, which insures that the battery does not lose charge. Further, the central pole and the plurality of peripheral poles may be mounted onto the main housing. The preferred portable power source 4 is preferably a rechargeable battery removably positioned inside the main housing. The portable power source 4 provides power to the electrically operated components such as the control unit 3. The control unit 3 is electronically connected to the actuation mechanism 23 of each of the plurality of plurality of deployable mechanisms 2. The control unit 3 may control the amount of lift generated by the lift-generating device 21. Further, the control unit 3 can also control the lift-generating device 21 of individual deployable mechanisms, separately. For example, reducing the thrust of a lift-generating device 21 of an arbitrary deployable mechanism, which increasing the thrust of a lift-generating device 21 of an adjacent deployable mechanism causes the present invention to pitch. This in turn propels the present invention towards the direction of the pitch. By varying the thrust generated by the lift-generating device 21 of each of the deployable mechanisms, the present invention can yaw, pitch, and roll.

Figure 7:
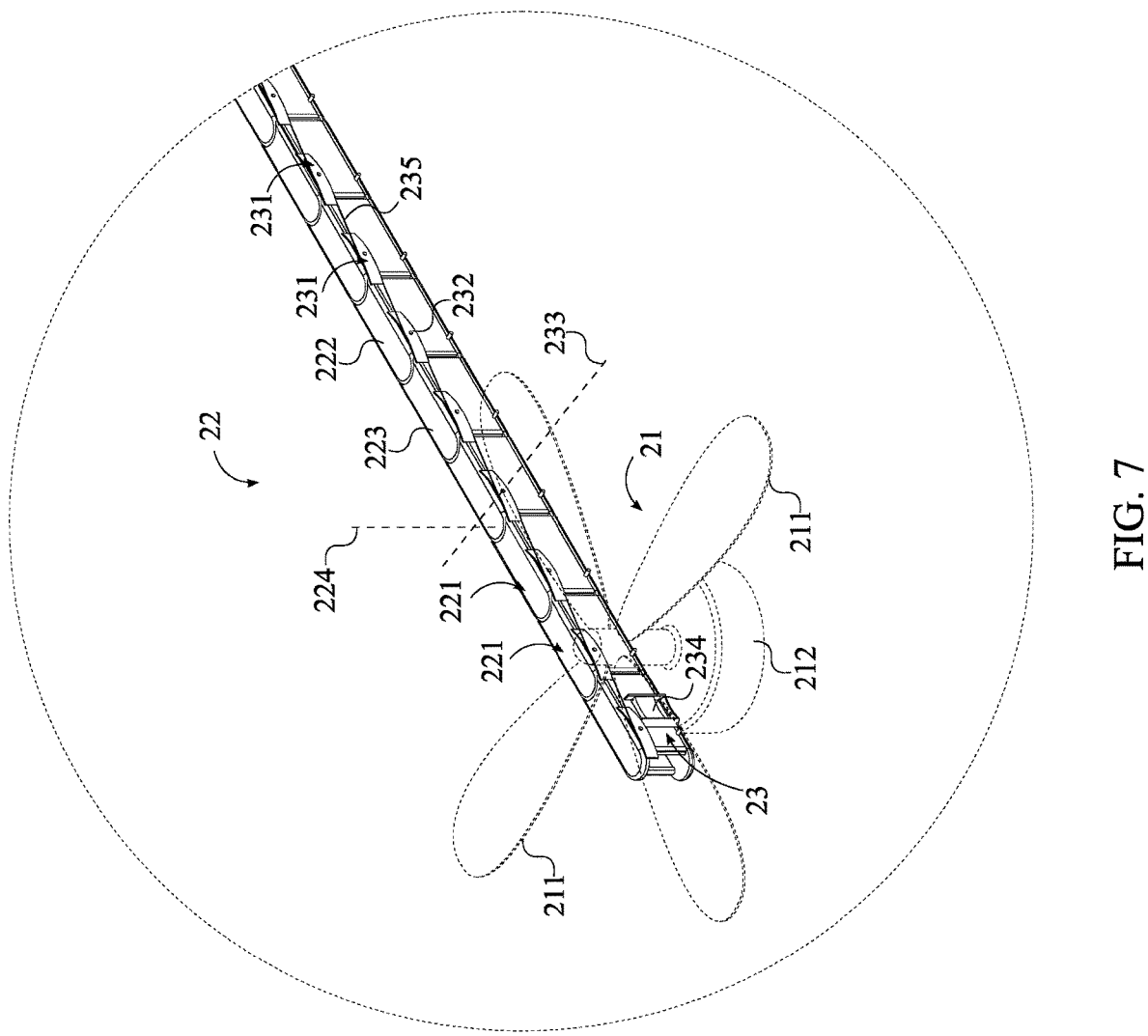
FIG. 7 is a top perspective view of section 7 in FIG. 1, showing the pliable pylon in the straight shape with the terminal link engaged to the lift-generating device.

Referring now to FIG. 7, the pliable nature of the pliable pylon 22 can be achieved by a variety of means. For example, the pliable pylon 22 may be composed of a flexible material that bends or flexes. However, the preferred embodiment of the pliable pylon 22 comprises a plurality of serially-coupled links 221. The actuation mechanism 23 allows the plurality of serially-coupled links 221 to rotate about one another, which causes the pliable pylon 22 to collapse into an arcuate shape. The preferred actuation mechanism 23 comprises a plurality of cams 231 and an activation switch 234. An arbitrary link 222 and an adjacent link 223 is hingedly connected to each other, wherein the arbitrary link 222 and the adjacent link 223 are from the plurality of serially-coupled links 221. A fixed end of a corresponding cam 232 is rotatably connected to the arbitrary link 222, wherein the corresponding cam 232 is from the plurality of cams 231. More specifically, the fixed end of the corresponding cam 232 is mounted adjacent to the partition between the arbitrary link 222 and the adjacent link 223. A free end of the corresponding cam 232 is tethered to the activation switch 234. The activation switch 234 is terminally mounted to the pliable pylon 22, opposite to the cylindrical structural body 1. Actuating the activation switch 234 causes the corresponding cam 232 to rotate about a pivot located on the arbitrary link 222 and rotates across faces of the arbitrary link 222 and the adjacent link 223. Thus, the activation switch 234 causes the corresponding cam 232 of the plurality of serially-coupled links 221 to rotate from a vertical position to a horizontal position.

The activation switch 234 of each of the plurality of deployable mechanisms 2 allows the pliable pylon 22 to transition from a collapsed position to an operative position, wherein the pliable pylon 22 is in a straight configuration. In the straight configuration, the lift-generating device 21 is operatively engaged to the activation switch 234, wherein the lift-generating device 21 is used to actuate the activation switch 234 and is used to consequently actuate the corresponding cam 232. The free end of the corresponding cam 232 is operatively engaged to the adjacent link 223, wherein the free end of the corresponding cam 232 is used to serially and longitudinally align the adjacent link 223 with the arbitrary link 222. More specifically, a projection extruding out of the adjacent link 223 allows the free end to be pivotably mounted adjacent link 223. As such, the fixed end of the cam being rotatably connected to the arbitrary link 222 about a rotation axis 233. Further, the arbitrary link 222 and the adjacent link 223 is hingedly connected to each other about a hinge axis 224. The hinge axis 224 and the rotation axis 233 are positioned perpendicular to each other. As such, when the activation switch 234 is activated, corresponding cam 232 rotates and overlaps the partition between the adjacent link 232 and the arbitrary link 222, thereby causing the adjacent link 232 to be parallel to the arbitrary link 222.

Figure 6:
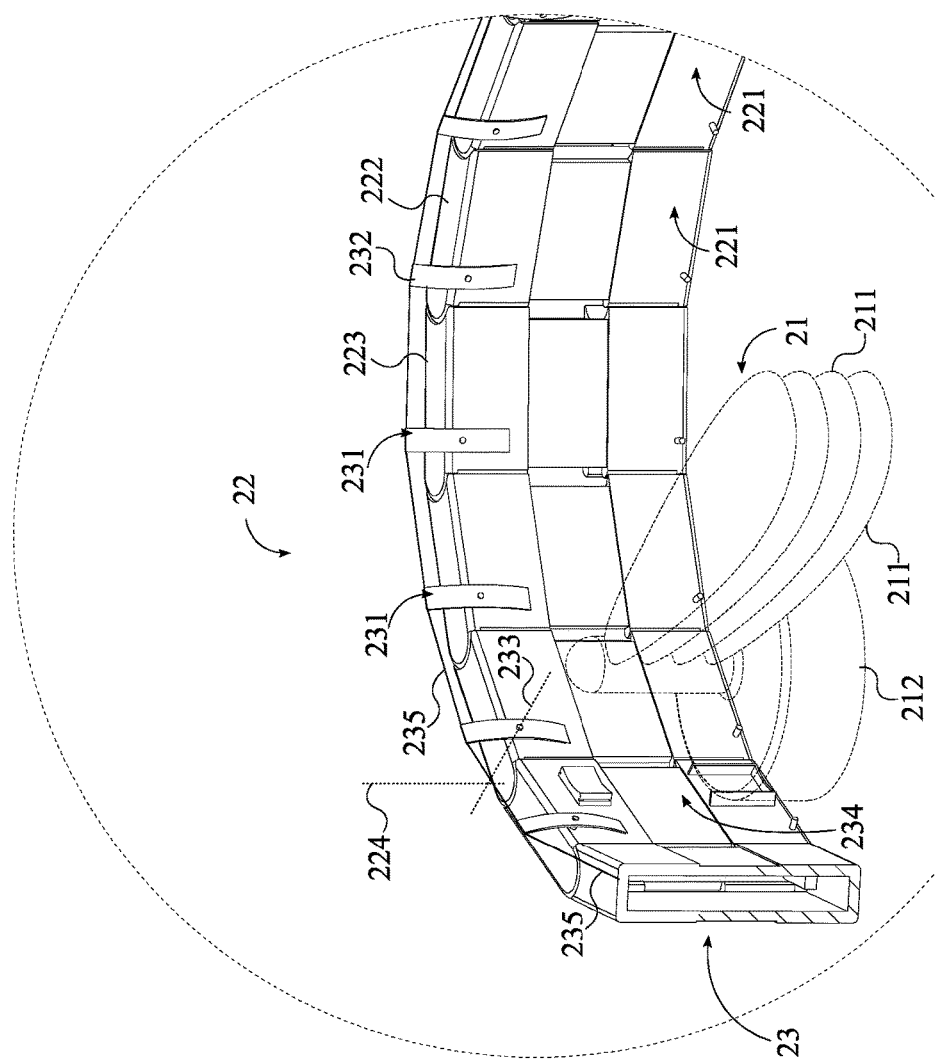
FIG. 6 is a top perspective view of section 6 in FIG. 5A, showing the pliable pylon in the arcuate shape with the terminal link detached from the lift-generating device.

FIG. 6 shows the present invention in the collapsed position. In the preferred embodiment, the pliable pylon 22 for each of the plurality of deployable mechanisms 2 are vertically collapsible. As such, the pliable pylon 22 may comprise plurality of pieces, slidably mounted on top of each other. The cam mounted to the terminal link is forced to rotate from a vertical position to a horizontal position, thereby forcing the plurality of cams 231 to rotate into a horizontal position.

In the preferred embodiment of the present invention, the plurality of cams 231 is an arcuate metal plate. More specifically, the arcuate metal plate has a C-shaped metal spring. The arcuate metal plate forces the arbitrary link 222 to rotate in relation to the adjacent link 223. Furthermore, as the corresponding cam 232 of an arbitrary link 222 transitions into a horizontal position, the corresponding cam 232 overlaps the adjacent link 223 across the shared joint. This forces the adjacent link 223 to become parallel with the arbitrary link 222. Executed over the plurality of serially-coupled links 221 by the plurality of cams 231, this mechanism allows the pliable pylon 22 to transition from an arcuate shape to a straight shape. More specifically, the lift-generating device 21 is mounted onto a most-distal link 226, wherein the most-distal link 226 is from the plurality of serially-coupled links 221. As such, the pliable pylon 22 positions the lift-generating device 21 offset from the cylindrical structural body 1, which prevents the cylindrical structural body 1 from interfering with the air flow over the lift-generating device 21. Similarly, the most-proximal link 225 is hingedly connected to the cylindrical structure body, wherein the most-proximal link 225 is from the plurality of serially-coupled links 221. Preferably, the most-proximal link 225 is mounted to a peripheral pole.

Referring once more to FIG. 1, FIG. 6 and FIG. 7, the preferred embodiment of the actuation mechanism 23 further comprises a cable 235. The cable 235 connects each of the plurality of cams 231 and the spool 11. As such, each of the plurality of cams 231 are tethered along the cable 235. More specifically, the cable 235 is terminally tethered to the cam mounted to the most-distal link 226. Further, the cylindrical structural body 1 is terminally tethered to the cable 235, opposite to the activation switch 234. Preferably, the cable 235 of the plurality of deployable mechanisms 2 is tethered to the spool 11. The cylindrical structural body 1 comprises a spool 11 that is rotatably mounted within the cylindrical structural body 1. More specifically, the spool 11 is rotatably mounted inside the central pole. The spool 11 is terminally tethered to the cable 235, opposite the activation switch 234. Further, the spool 11 is mechanically coupled to a rotational input, whereby the spool 11 is rotated. In one embodiment, a recovery device is responsible for recovering and storing the present invention. In such an embodiment, when the present invention lands on the recovery device, the recovery device latches on to the rotational input of the spool 11. The recovery device twists the spool 11 which winds the cable 235 around the spool 11. This allows the pliable pylon 22 to collapse into an arcuate shape. In another embodiment, the rotational input may be twisted manually by the user to transform the present invention into the collapsed configuration.

Figure 4:
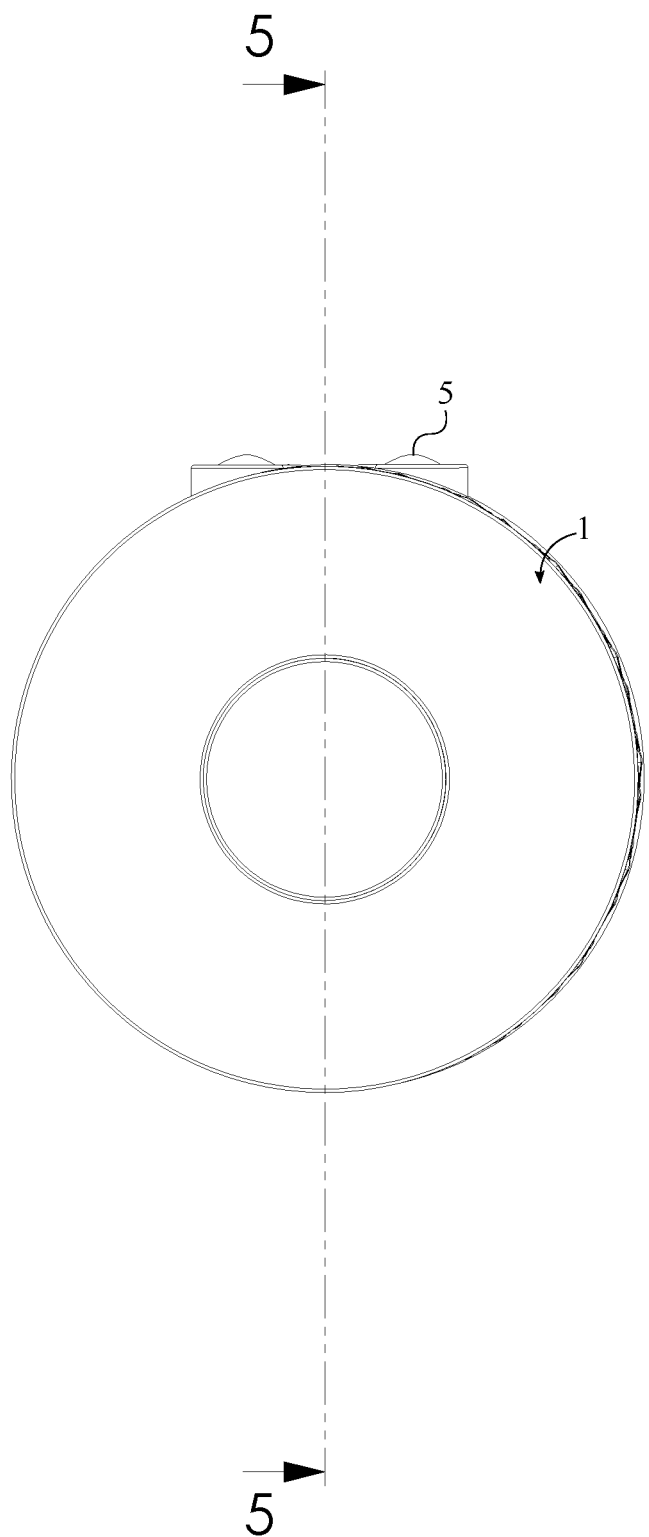
FIG. 4 is a top planform view of the present invention.
Figure 5A:
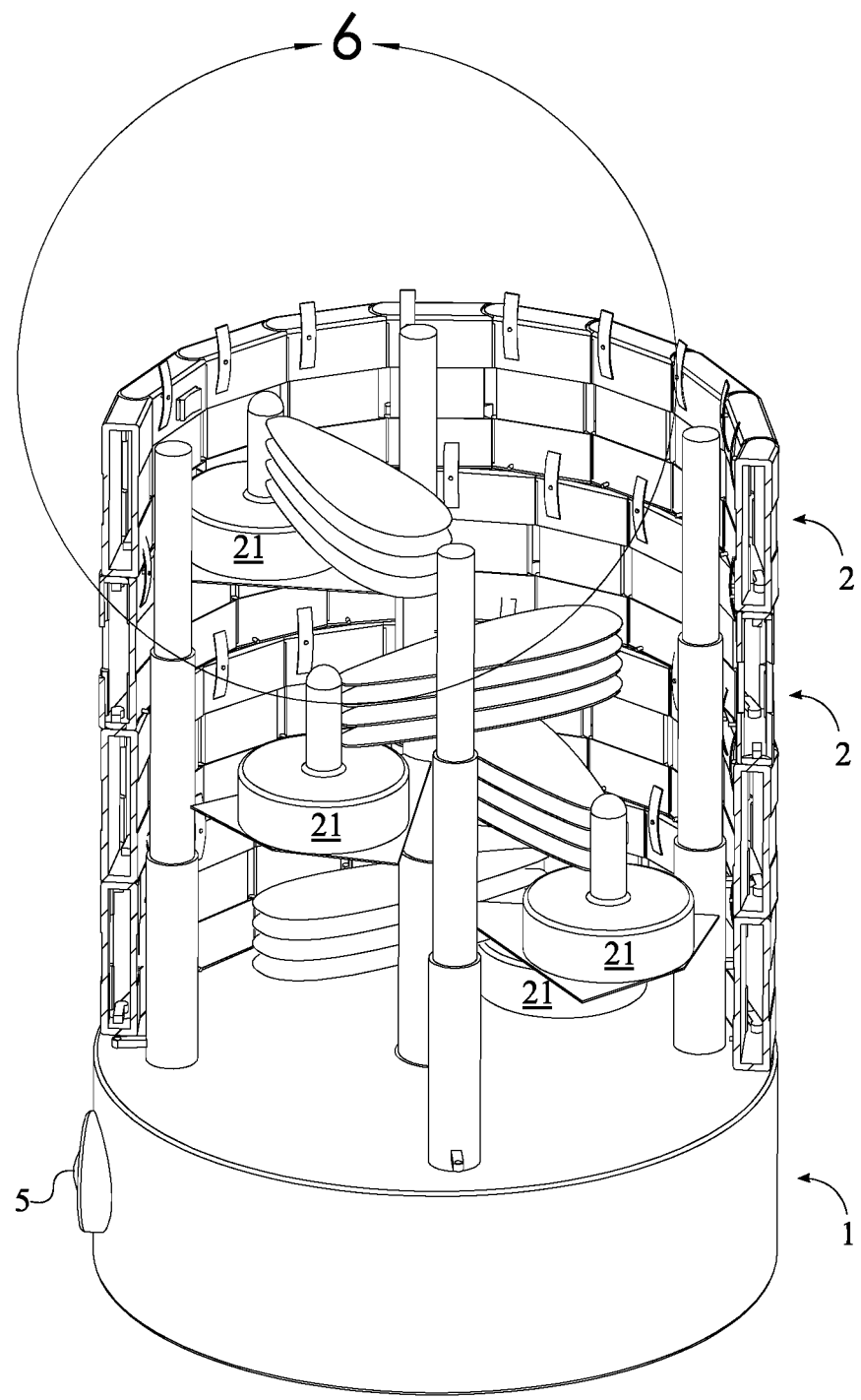
FIG. 5A is a top perspective view of section 5-5 in FIG. 4, showing the lift-generating device of the plurality of deployable mechanisms stored in the cylindrical structural body.
Figure 5B:
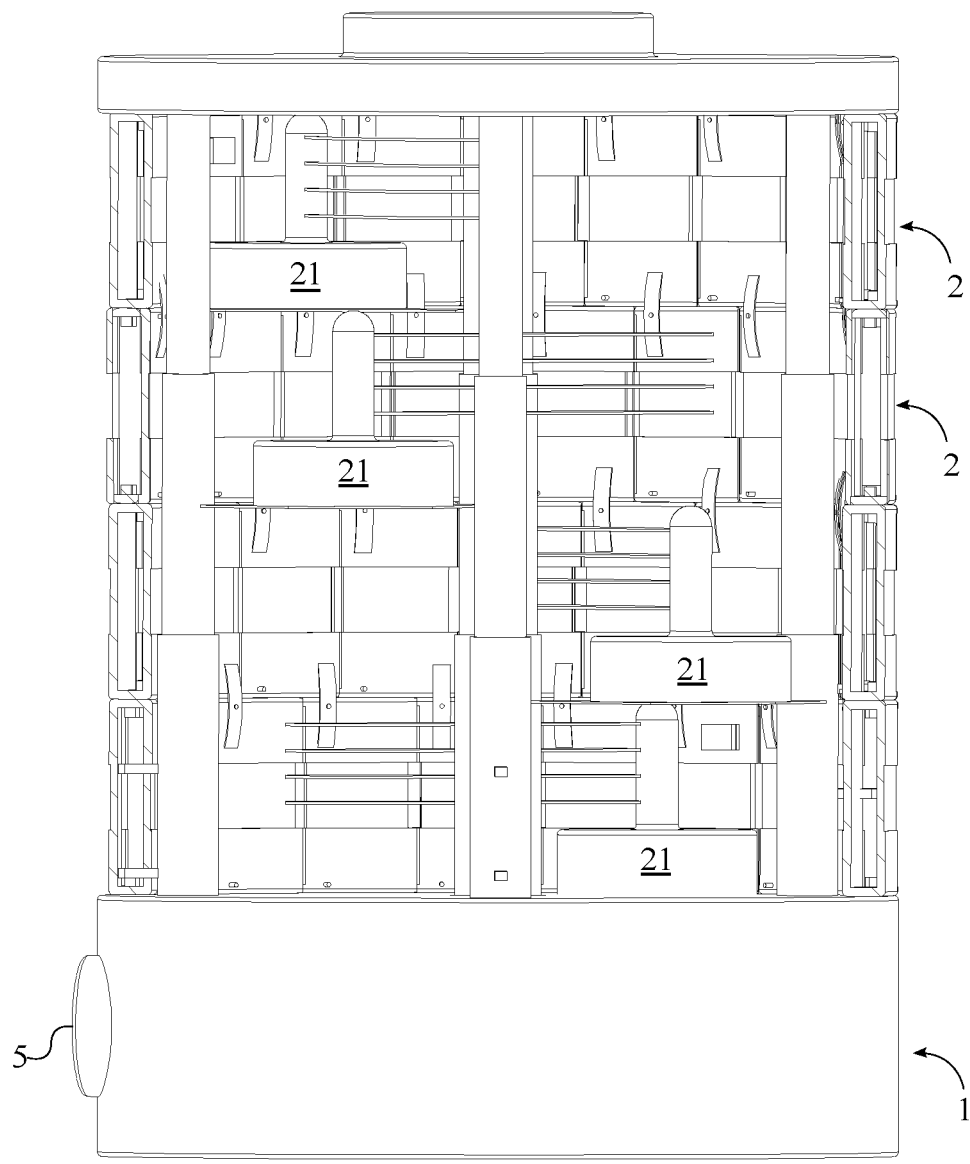
FIG. 5B is a side planform view of section 5-5 in FIG. 4.

As can be seen in FIG. 4, FIG. 5A, and FIG. 5B, the preferred embodiment of the lift-generating device 21 comprises an electrically-powered motor 212 and a plurality of propellers 211. In the collapsed configuration, the plurality of propellers 211 is folded into each other, and the pliable pylon 22 is in the collapsed position. As the present invention transitions into an operative configuration, the plurality of propellers 211 unfolds to increase the effective span of the propeller blades. The plurality of propellers 211 is coaxially mounted to a rotational output of the electrically-powered motor 212. For example, the plurality of propellers 211 may be mounted to a shaft integrated to the armature of the electrically-powered motor 212. Electrical power provided by the portable power source 4, is used to drive the electrically-powered motor 212, as can be seen in FIG. 11. As such, the electrically-powered motor 212 for each of the plurality of deployable mechanisms 2 is electrically connected to the portable power source 4.

Figure 10:
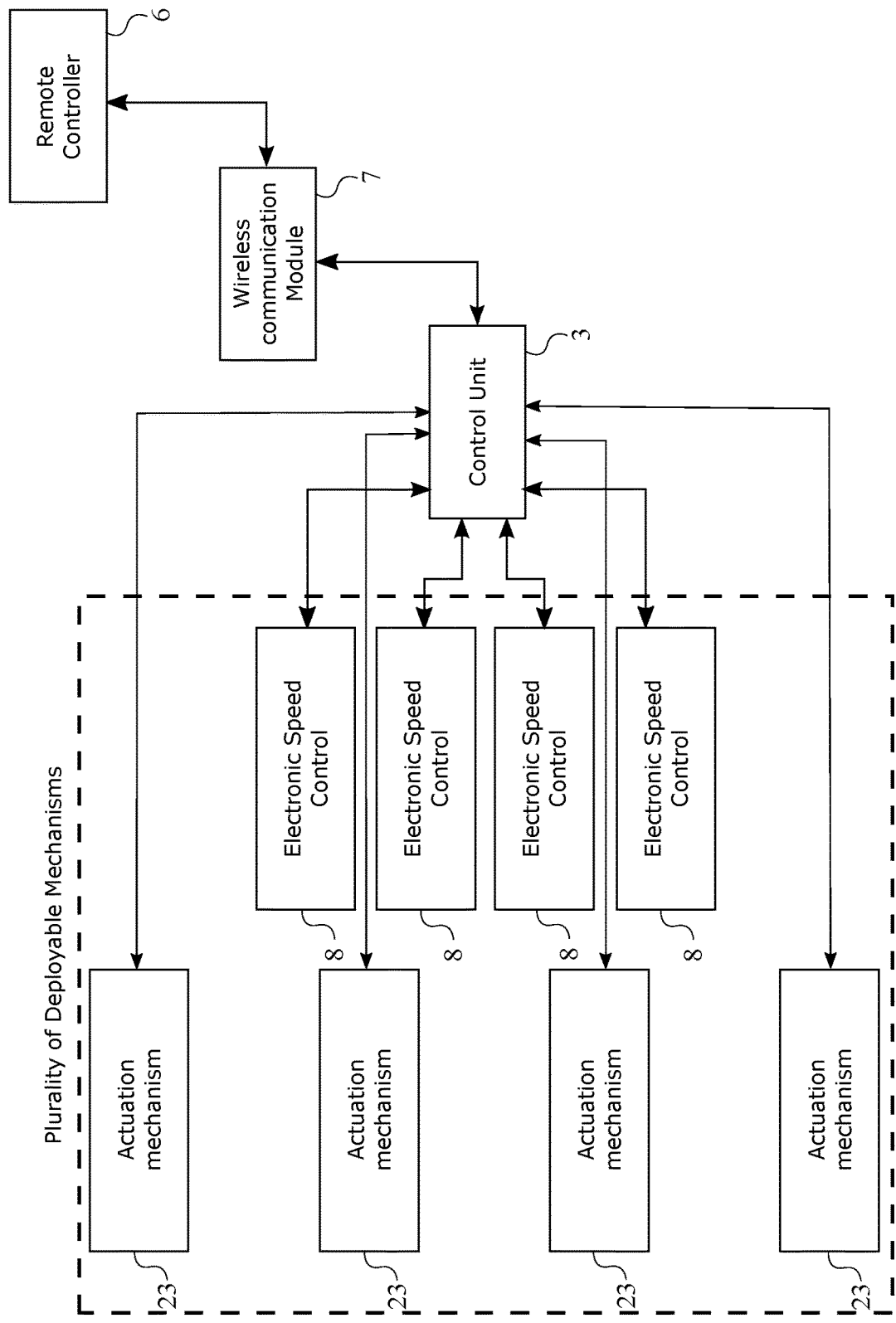
FIG. 10 is a schematic view of the electronic connections of the present invention.

Referring now to FIG. 10, the preferred embodiment of the present invention may be controlled by a remote controller 6 like a traditional unmanned aerial vehicle. As such, the present invention is equipped with a wireless communication module 7. The wireless communication module 7 is mounted within the cylindrical structural body 1. The wireless communication module 7 is electronically connected to the control unit 3, which allows the control unit 3 to receive and transmit signals via the wireless communication module 7. Similarly, the remote controller 6 is configured to receive and transmit signals from the wireless communication module 7. As such, the remote controller 6 is communicably coupled to the wireless communication module 7, whereby a user can use the remote controller 6 to navigate the present invention. In another embodiment of the present invention, the remote controller 6 may be used solely to communicate with the control unit 3. In this case, the present invention may be equipped with machine vision to automatically recognize targets of interests and transmit their locations to the remote controller 6. As such, the remote controller 6 can also be used to provide soldiers with intelligent targeting capabilities to avoid collateral damages.

Further, the present invention may also be equipped with an electronic speed control 8. More specifically, each of the plurality of deployable mechanisms 2 further comprises an electronic speed control 8. The electronic speed control 8 is operatively integrated into the lift-generating device 21, wherein the electronic speed control 8 is used to regulate an amount of aerial lift generated by the lift-generating device 21. As such, the electronic speed control 8 is electronically connected to the control unit 3.

Figure 8:
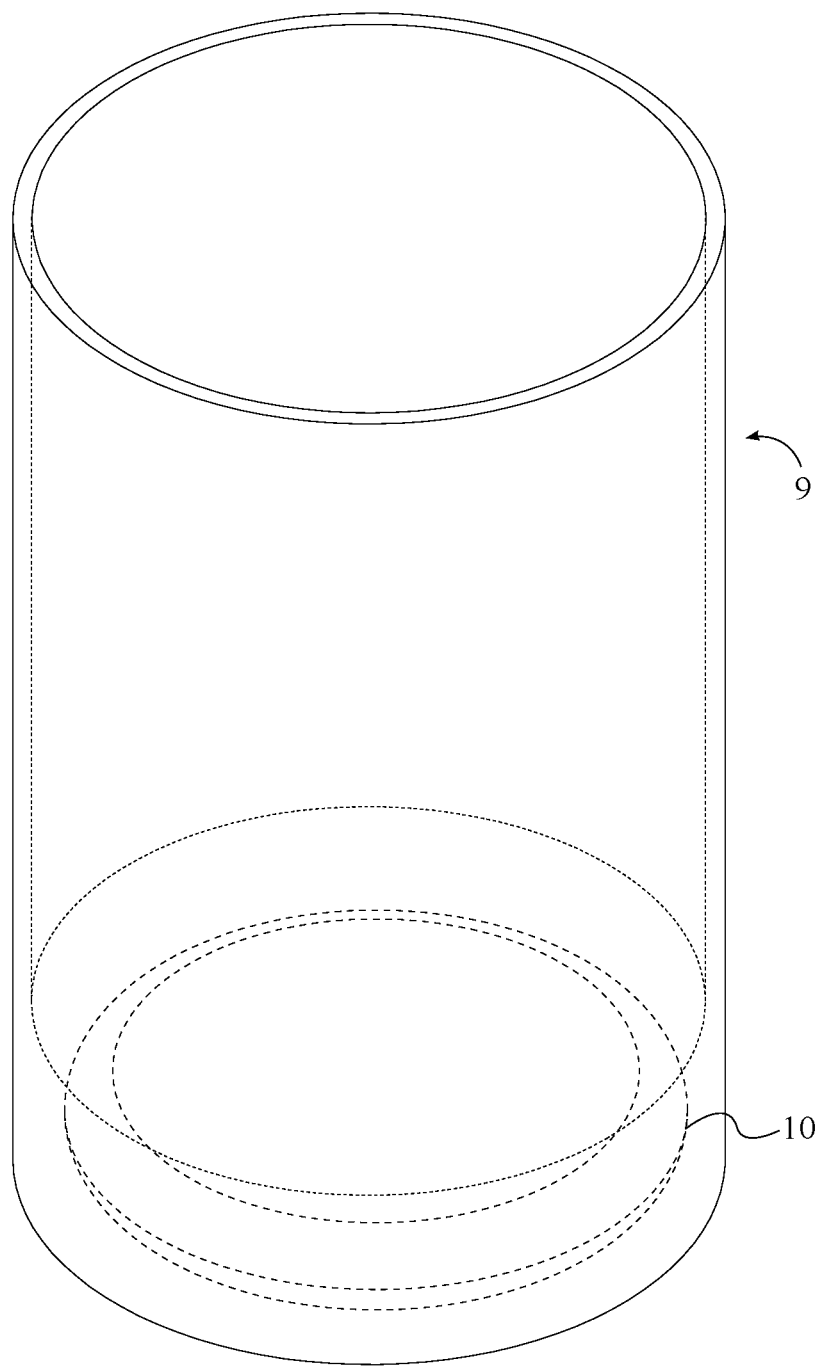
FIG. 8 is a top perspective view of the receptacle and the rapid-deployment mechanism with the rapid-deployment mechanism shown in a transparent view.
Figure 9:
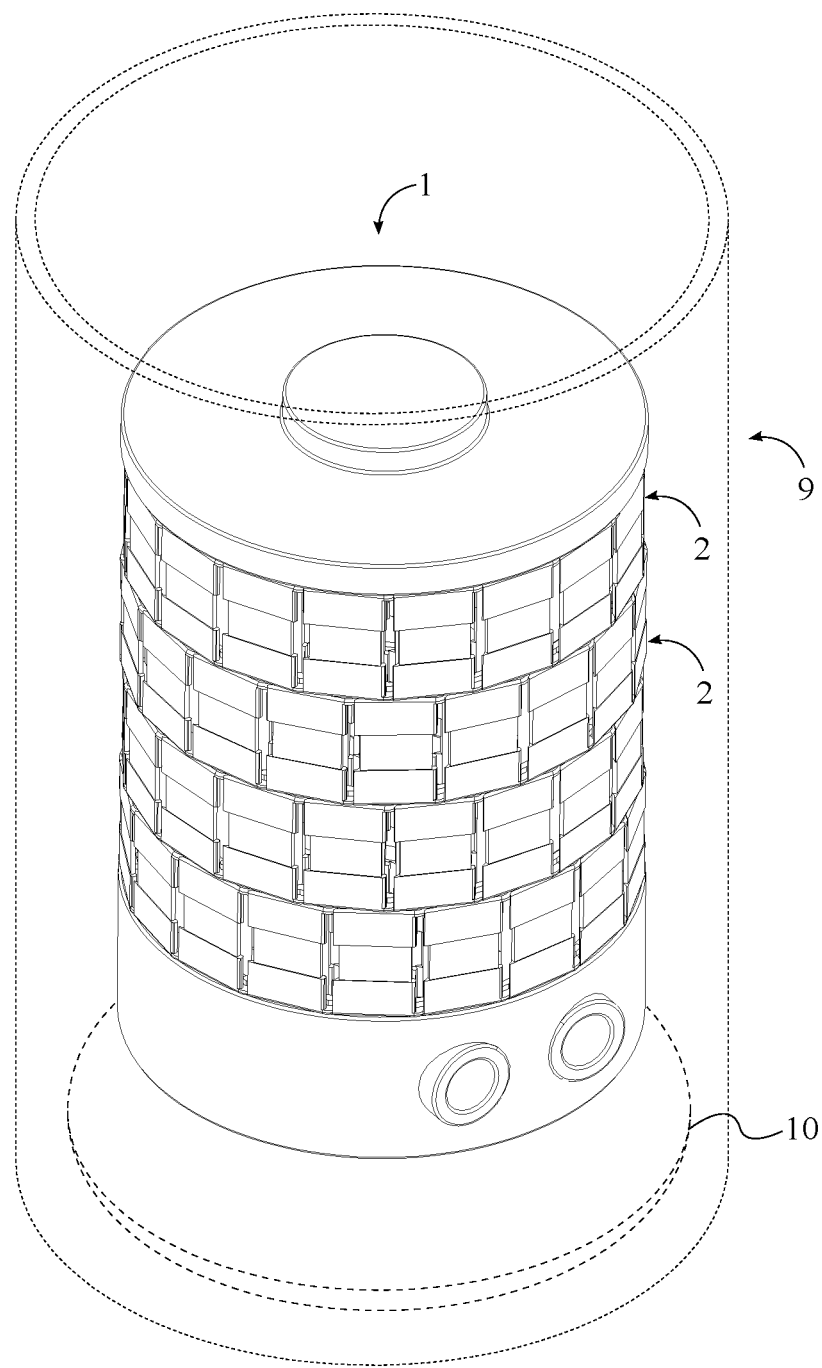
FIG. 9 is a top perspective view of the receptacle and the rapid-deployment mechanism with the plurality of deployable mechanisms, the control unit, and the portable power source being collapsibly configured into a projectile within the receptacle.

As can be seen in FIG. 7 and FIG. 8 and FIG. 9, in order to facilitate rapid deployment of the present invention, a launching receptacle 9 and a rapid-deployment mechanism 10 are provided. The launching receptacle 9 may be a cylindrical container dimensioned to fit easily into small spaces and be easily carried by a human. In order to store the present invention in the launching receptacle 9, the cylindrical structural body 1, the plurality of deployable mechanisms 2, the control unit 3, and the portable power source 4 are collapsibly configured into a projectile. Once configured, the projectile is positioned within the launching receptacle 9. The rapid-deployment mechanism 10 is operatively integrated in between the projectile and the launching receptacle 9, wherein the rapid deployment mechanism is used to launch the projectile out of the launching receptacle 9. The rapid-deployment mechanism 10 launches the present invention with sufficient force to compress the upper button. This in turn triggers the actuation mechanism 23, thereby allows the pliable pylon 22 to expand into the straight configuration. In the preferred embodiment of the present invention, the receptacle is a cylindrical canister. Likewise, the rapid-deployment mechanism 10 is a pyrotechnic charge positioned under the projectile. The pyrotechnic charge explodes to generate a massive force which launches the projectile several feet into the air, whereby the present invention continues on the desired flight path. The force of the explosion, is preferably enough to trigger the actuation mechanism 23 which causes the plurality of deployable mechanisms 2 to expand. A heat-shielding plate positioned between the projectile and the pyrotechnic charge protects the projectile from the heat generated by the pyrotechnic explosion.

Although the invention has been explained in relation to its preferred embodiment, it is to be understood that many other possible modifications and variations can be made without departing from the spirit and scope of the invention as hereinafter claimed.

What is claimed is:

1. A collapsible unmanned aerial vehicle system comprising:
   a cylindrical structural body;
   a plurality of deployable mechanisms;
   a control unit;
   a portable power source;
   the plurality of deployable mechanisms being laterally distributed about the cylindrical structural body;
   each of the plurality of deployable mechanisms comprising a lift-generating device, a pliable pylon and an actuation mechanism, the cylindrical structural body being terminally mounted to the pliable pylon, the lift-generating device being terminally mounted to the pliable pylon opposite to the cylindrical structural body, the actuation mechanism being operatively integrated along the pliable pylon, the pliable pylon being selectively configured to be radially straightened from the cylindrical structural body and to arcuately collapsed into the cylindrical structural body via the actuation mechanism, the control unit being electronically connected to the actuation mechanism, the portable power source being electrically connected to the actuation mechanism, the pliable pylon comprising a plurality of serially-coupled links, two adjacent links among the plurality of serially-coupled links being hingedly connected to each other about a hinge axis, the actuation mechanism comprising a plurality of cams, a corresponding cam among the plurality of cams being rotatably connected to a corresponding link among the plurality of serially-coupled links about a rotation axis, each of the plurality of hinge axes and each of the plurality of rotation axes being perpendicularly positioned to each other, two corresponding adjacent links among the plurality of serially-coupled links being selectively in a straight configuration by the corresponding cam being rotated to serially and longitudinally align the two corresponding adjacent links with each other and in a collapsed configuration by the corresponding cam being rotated to not serially and longitudinally align the two corresponding adjacent links;
   the control unit and the portable power source being mounted within the cylindrical structural body; and
   the portable power source being electrically connected to the control unit.

2. The collapsible unmanned aerial vehicle system as claimed in claim 1 further comprising:
   a sensing unit;
   the sensing unit being laterally mounted onto the cylindrical structural body; and
   the sensing unit being positioned in between the plurality of deployable mechanisms and a base portion of the cylindrical structural body.

3. The collapsible unmanned aerial vehicle system as claimed in claim 1 further comprising:
   a most-proximal link among the plurality of serially-coupled links being hingedly connected to the cylindrical structural body.

4. The collapsible unmanned aerial vehicle system as claimed in claim 1 further comprising:
   the lift-generating device being mounted onto a most-distal link among the plurality of serially-coupled links.

5. The collapsible unmanned aerial vehicle system as claimed in claim 1 further comprising:
   the lift-generating device comprising an electrically-powered motor and a plurality of propellers;
   the plurality of propellers being coaxially mounted to a rotational output of the electrically-powered motor; and
   the electrically-powered motor for each of the plurality of deployable mechanisms being electrically connected to the portable power source.

6. The collapsible unmanned aerial vehicle system as claimed in claim 1 further comprising:
   a remote controller;
   a wireless communication module;
   the wireless communication module being mounted within the cylindrical structural body;
   the wireless communication module being electronically connected to the control unit; and
   the remote controller being communicably coupled to the wireless communication module.

7. The collapsible unmanned aerial vehicle system as claimed in claim 1 further comprising:
   each of the plurality of deployable mechanisms further comprising an electronic speed control, the electronic speed control being operatively integrated into the lift-generating device, the electronic speed control being used to regulate an amount of aerial lift generated by the lift-generating device, the electronic speed control being electronically connected to the control unit.

8. The collapsible unmanned aerial vehicle system as claimed in claim 1 further comprising:
   a launching receptacle;
   a deployment mechanism;
   the cylindrical structural body, the plurality of deployable mechanisms, the control unit and the portable power source being collapsibly configured into a projectile;
   the projectile being positioned within the launching receptacle;
   the deployment mechanism being operatively integrated in between the projectile and the launching receptacle; and
   the deployment mechanism is-being used to launch the projectile out of the launching receptacle.

* * * * *